United States Patent [19]

Yang

[11] Patent Number: 4,762,463
[45] Date of Patent: Aug. 9, 1988

[54] FAN HAVING SPEED INDICATOR

[76] Inventor: Tai-Her Yang, 5-1 Taipin St., Si-Hu Town; Dzan-Hwa, Taiwan

[21] Appl. No.: 35,387

[22] Filed: Apr. 7, 1987

[51] Int. Cl.⁴ .............................................. F04B 21/00
[52] U.S. Cl. .................... 416/61; 416/170 R; 416/5; 417/572
[58] Field of Search ............... 416/5, 61, 170 C, ; 340/671; 417/572

[56] References Cited

U.S. PATENT DOCUMENTS

| | | | |
|---|---|---|---|
| 2,912,159 | 11/1959 | Ganger et al. | 416/95 |
| 4,494,055 | 1/1985 | Bitting | 416/5 X |
| 4,675,663 | 6/1987 | Corwin | 416/61 X |

Primary Examiner—Everette A. Powell, Jr.
Attorney, Agent, or Firm—Leonard Bloom

[57] ABSTRACT

A multispeed ceiling fan having a plurality of blades, a speed-selecting switch and an a.c. split-phase induction motor. The motor has a rotor and at least one stator winding. The speed selecting switch is arranged to apply respectively different voltages or currents to the motor for each respective selected speed. At least one lamp is connected in parallel to either the main stator winding or in parallel to a phase-shifting capacitor in series with an auxiliary stator winding, as an indicator providing a visible indication of the selected speed for the motor. The at least one lamp may comprise a plurality of lamps, at least all but one being in series with a respective plurality of Zener diodes so that they become energized in sequence as the voltage across the respective lamps or across the lamps in series with the respective pluralities of diodes increases.

19 Claims, 4 Drawing Sheets

FAN HAVING SPEED INDICATOR

BACKGROUND OF THE INVENTION

1. Field of the Invention

The invention relates broadly to fans powered by electric motors and, more particularly, to ceiling fans powered by a.c. induction motors provided with one or more selected speed indicating lamps.

2. The Prior Art

Conventional ceiling fans having a plurality of running speeds, for example, three different speeds are not unusual. The speed changes are often effected by a multiple-position switch actuated by a single pull-chain or the like. The fan blades are relatively large and heavy; consequently, acceleration or deceleration, whenever an operator elects to change speed, is slow because of the inertia not only of the fan blades but the mass of the moving parts of the a.c. induction motor and coupling mechanism which drives the blades. This is a distinct shortcoming because the operator must wait until the selected speed of the fan is, in fact, achieved to make any judgement of which of the available speeds has been selected. This can be aggravating and time consuming. Often over ten seconds or tens of seconds are required to reach the set running speed.

Moreover, even were an operator to wait until the set speed has been achieved, and observe the rotating blades, his conclusion as to the actual speed would be totally subjective and subject to error. The risk of error would be very great, were the operator to have had little or no experience in operating the particular fan involved, and may be impossible in the absence of experience.

Similar disadvantages exist whenever an operator initially turns a ceiling fan on, especially in fan installations wherein the on-off function is effected by one switch and the speed-selecting function is effected by another switch.

SUMMARY OF THE INVENTION

An object of the present invention is to provide a ceiling fan which overcomes the above-noted disadvantages.

Another object of the present invention is to provide a ceiling fan which includes a speed indicator which allows an operator to determine which speed has been set, without waiting for the fan to have reached its set speed.

An additional object of the present invention is to provide a ceiling fan which allows an operator to observe which speed has been set on an objective basis.

A further object of the present invention is to provide a ceiling fan having one or more lamps which function as a set speed indicating devices.

The foregoing objects, as well as others which are to become apparent from the text below, are achieved in a ceiling fan by providing one or more lamps which respond to the magnitude of voltage across a stator winding or across a phase shifting capacitor in series with an auxiliary stator winding.

From one vantage point, the invention can be seen as being in a ceiling fan having a plurality of blades, a speed-selecting switch, a rotor and at least one stator winding. The speed-selecting switch is operatively arranged to apply respectively different magnitudes of voltage across the at least one stator winding for each respective speed. At least one lamp is connected across at least a portion of the at least one stator winding. The intensity of light from the at least one lamp is indicative of the selected speed.

From another vantage point, the invention can be seen as being in a ceiling fan having a plurality of blades, a speed-selecting switch, a rotor, a main stator winding, an auxiliary stator winding, and a phase-shifting capacitor. The capacitor is connected in series with the auxiliary stator winding. The phase-shifting capacitor and the auxiliary winding are connected in series with one another across the main stator winding. The speed-selecting switch is operatively arranged to place respectively different magnitudes of voltage across the phase-shifting capacitor for each respective speed. At least one lamp is connected across the phase-shifting capacitor. The intensity of light from the at least one lamp is indicative of the selected speed.

From one viewpoint, the invention can be seen as being in a ceiling fan having a plurality of blades, a speed-selecting switch, a rotor and at least one stator winding. The speed-selecting switch is operatively arranged to apply respectively different magnitudes of voltage across the at least one stator winding for each respective speed. Respective pluralities of Zener diodes are provided. A plurality of lamps are connected across at least a portion of the at least one stator winding via respective ones of the pluralities of Zener diodes. Individual ones of the lamps become energized as the voltage across the at least one stator winding increases. The number of lamps energized at any given time being indicative of the selected speed.

From another viewpoint, the invention can be seen as being in a ceiling fan having a plurality of blades, a speed-selecting switch, a rotor, a main stator winding, an auxiliary stator winding, and a phase-shifting capacitor. The capacitor is connected in series with the auxiliary stator winding. The phase-shifting capacitor and the auxiliary winding are connected in series with one another across the main stator winding. The speed-selecting switch is operatively arranged to place respectively different magnitudes of voltage across the phase-shifting capacitor for each respective speed. Respective pluralities of Zener diodes are provided. A plurality of lamps are connected across the phase-shifting capacitor via respective ones of the pluralities of Zener diodes. Individual ones of the lamps become energized as the voltage across the phase-shifting capacitor increases, the number of lamps energized at any given time being indicative of selected speed.

The invention can also be seen as being in a ceiling fan having an a.c. electric motor, a plurality of blades and speed-selecting switch arranged to feed current of respectively different levels to the motor for providing respectively different speeds of rotation. At least one lamp is in series with the speed selecting switch. The intensity of light from the lamp is indicative of the selected speed.

In a broad aspect, the invention can be seen as being in a ceiling fan having a plurality of blades, a speed-selecting switch, and an electric motor having a rotor and at least one stator winding. The speed-selecting switch is operatively arranged to apply respectively different magnitudes of voltage or current to the motor for each respective speed. At least one lamp is operatively arranged to indicate the speed selected by the speed-selecting switch.

DETAILED DESCRIPTION OF THE PREFERRED EMBODIMENTS

Figure 1:
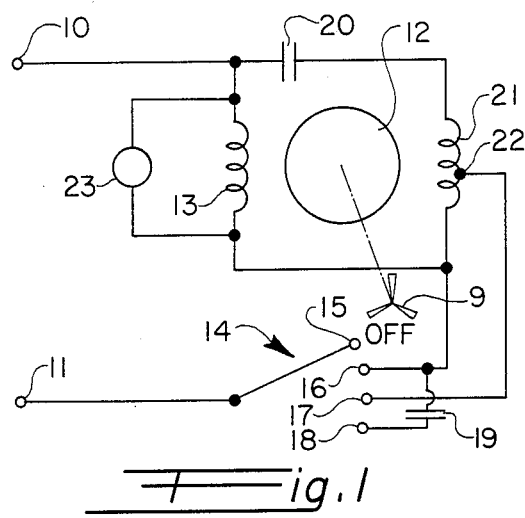
FIG. 1 is a simplified schematic diagram of an exemplary, first embodiment of a ceiling fan constructed in accordance with the present invention, one lamp being used as a selected speed indicating device.

As illustrated in FIG. 1, the first exemplary embodiment includes diagrammatically shown fan blades 9. Alternating current (a.c.) power is supplied via a pair of terminals 10, 11 to a split-phase induction motor which includes a rotor 12, the rotor being mechanically coupled or connected to the fan blades 9. The induction motor includes a main stator winding 13 and an auxiliary stator winding 21, which also functions as a starting winding. The auxiliary stator winding is connected in series with a conventional phase shifting capacitor 20, this series circuit being connected in parallel with the main stator winding 13.

One terminal of the capacitor 20 and one terminal of the main stator winding 13 are conductively connected to the a.c. input terminal 10. The other ends of the main stator winding 13 and the auxiliary stator winding 21 are coupled to the second terminal 11 of the a.c. source, via a single pole, four-position switch 14. In its OFF position, the single pole of the switch 14 is positioned on an open or rest terminal 15, and no current is supplied to either of the stator windings 13 and 21.

In its first ON position, the single pole of the switch 14 contacts a terminal 16, placing full a.c. voltage across the main stator winding 13 and across the series connection of the auxiliary stator winding 21 and the phase shifting capacitor 20. In this position, maximum speed is called for and the full magnitude of a.c. voltage appears across the main stator winding 13, which has an indicating lamp 23 conductively connected in parallel therewith. The lamp 23 thus receives full a.c. voltage, a high magnitude of current flows through the lamp and it glows most brightly; that is, the intensity of the lamp 23 is at its maximum. This allows an operator to know immediately that the selected speed is at the maximum, even before the fan gets up to the selected speed. In its second ON position, the single pole of the switch 14 contacts a terminal 17, which is conductively coupled to a tap 22 on the auxiliary stator winding 21. In this case, less than full a.c. voltage appears across the main stator winding 13, some of it appearing across the lower portion of the auxiliary stator winding 21. Thus, less than full a.c. voltage appears across the lamp 23, current of a lesser magnitude flows through the lamp 23 and it glows less brightly; that is, with a perceptable lesser intensity than the maximum intensity making it easy for the operator to conclude from merely observing the light intensity (brightness) of the lamp that the fan is being operated at its second speed, even before this actual speed is achieved. In the third ON position of the switch 14, the single pole thereof contacts a terminal 18, thereby placing a voltage-dropping capacitor 19 in series with both the main stator winding 13 and the auxiliary stator winding 21. The a.c. motor is thus called to operate at its lowest speed, considerably less than full a.c. voltage is applied across the main stator winding 13. As a result, the lamp 23 glows with its least intensity, allowing the operator to conclude that the lowest speed has been selected.

Figure 2:
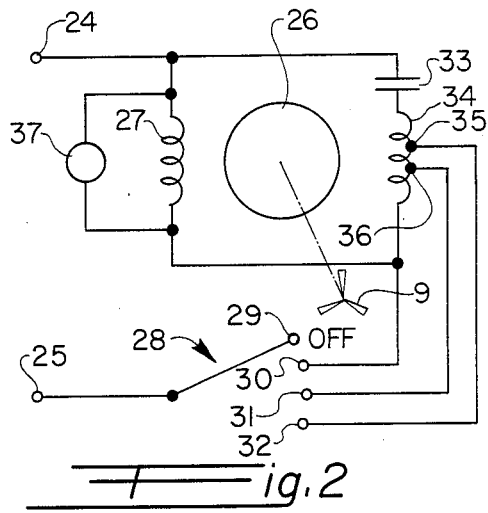
FIG. 2 is a simplified schematic diagram of a variant of the ceiling fan illustrated in FIG. 1.

As illustrated in FIG. 2, a variant of the first exemplary embodiment includes diagrammatically shown fan blades 9. Alternating current (a.c.) power is supplied via a pair of terminals 24, 25 to the split-phase induction motor which includes a rotor 26, the rotor being mechanically coupled or connected to the fan blades 9. The induction motor includes a main stator winding 27 and an auxiliary stator winding 34 which also functions as a starting winding, the auxiliary stator winding being connected in series with a conventional phase shifting capacitor 33 in parallel with the main stator winding 27.

One terminal of the capacitor 33 and one terminal of the main stator winding 27 are conductively connected to the a.c. input terminal 24. The other ends of the main stator windings 27 and the auxiliary stator winding 34 are coupled to the second terminal 25 the a.c. source, via a single pole, four-position switch 28. In its OFF position, the single pole of the switch 28 is positioned on an open or rest terminal 29 and no current is supplied to either of the stator windings 27 and 34.

In its first ON position, the single pole of the switch 28 contacts a terminal 30, placing full a.c. voltage across the main stator winding 27 and across the series connection of the auxiliary stator winding 34 and the phase shifting capacitor 33. In this position, maximum speed is called for and the full magnitude of a.c. voltage appears across the main stator winding 27, which has an indicating lamp 37 conductively connected in parallel therewith. The lamp 37 receives full a.c. voltage, a high magnitude of current flows through the lamp and it glows most brightly; that is, the lamp 37 has a maximum perceptable intensity. This allows an operator to know immediately that the selected speed is the maximum, even before the fan gets up to the selected speed. In its second ON position, the single pole of the switch 28 contacts a terminal 31, which is conductively coupled to a first tap 36 on the auxiliary stator winding 34. In this case less than full a.c. voltage appears across the main stator winding 27, some of it appearing across the lower portion of the auxiliary stator winding 34. Thus, less than full a.c. voltage appears across the lamp 37, current of a lesser somewhat magnitude flows through the lamp and it glows perceptably less brightly, making it easy for the operator to conclude from merely observing the light intensity (brightness) of the lamp that the fan is being operated at its second speed, even before this actual speed is achieved. In the third ON position of the switch 28, the single pole thereof contacts a terminal 32 which is connected to a second tap 35 on the auxiliary stator winding 34. In this position, still less voltage is applied across the main stator winding 27. The a.c. motor is thus called to operate at its lowest speed, still less than full a.c. voltage being applied across the main stator winding 27. As a result, the lamp 37 glows with its least intensity, allowing the operator to conclude that the lowest speed has been selected even before the fan reaches that particular speed.

Figure 3:
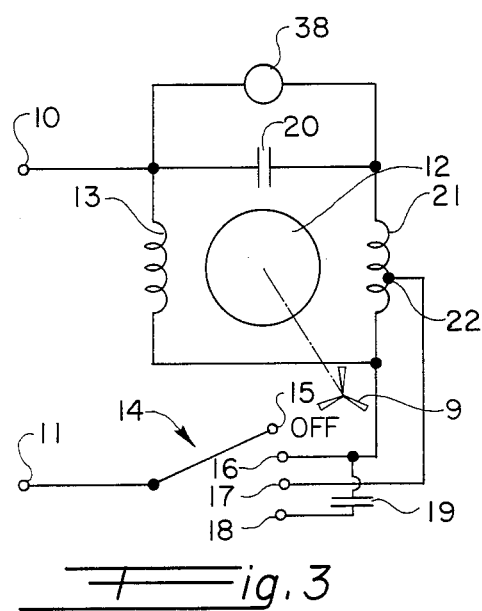
FIG. 3 is a simplified schematic circuit diagram of an exemplary, second embodiment of a ceiling fan constructed in accordance with the present invention, a single lamp being shown as a selected speed indicating device.

As illustrated in FIG. 3, the second exemplary embodiment includes diagrammatically shown fan blades 9. Alternating current (a.c.) power is supplied via a pair of input terminals 10, 11 to the split-phase induction motor which includes a rotor 12, the rotor being mechanically coupled or connected to the fan blades 9. The induction motor includes a main stator winding 13 and an auxiliary stator winding 21 which also functions as a starting winding, the auxiliary stator winding being connected in series with a conventional phase shifting capacitor 20, this series connected circuit being connected in parallel with the main stator winding 13.

One terminal of the capacitor 20 and one terminal of the main stator winding 13 are conductively connected to the a.c. input terminal 10. The other ends of the stator windings 13 and 21 are coupled to the second terminal 11 from the a.c. source, via a single pole, four-position switch 14. In its OFF position, the single pole of the switch 14 is positioned on an open or rest terminal 15 and no current is supplied to either of the main stator winding 13 and the auxiliary stator winding 21.

In its first ON position, the single pole of the switch 14 contacts a terminal 16, placing full a.c. voltage across the main stator winding 13 and across the series connection of the auxiliary stator winding 21 and the phase shifting capacitor 20. A lamp 38 is connected in parallel to the capacitor 20. In this position, maximum speed is called for and the full magnitude of a.c. voltage appears across the main stator winding 13. The lamp 38 receives a proportion of the full a.c. voltage, a given magnitude of current flows through the lamp and it glows with a given perceptable intensity. This allows an operator to know immediately that the selected speed is the maximum, even before the fan gets up to the selected speed. In its second ON position, the single pole of the switch 14 contacts a terminal 17, which is conductively coupled to a tap 22 on the auxiliary stator winding 21. In this case less than full a.c. voltage appears across the main stator winding 13, some of it appearing across the lower portion of the auxiliary stator winding 21. Thus, less than full a.c. voltage appears across the capacitor 20 and the lamp 38, current of less than maximum magnitude flows through the lamp 38 and it glows with a predetermined perceptable intensity, making it easy for the operator to conclude from merely observing the light intensity (brightness) of the lamp that the fan is being operated at its second speed, even before this actual speed is achieved. In the third ON position of the switch 14, the single pole thereof contacts a terminal 18, thereby placing a capacitor 19 in series with both the main stator winding 13 and the auxiliary stator winding 21. The a.c. motor is thus called to operate at its lowest speed, still less than full a.c. voltage is applied across the main stator winding 13 and across the capacitor 20 and the auxiliary stator winding 21. As a result, the lamp 38 glows with third perceptable intensity different from the above-mentioned given and predetermined intensities, allowing the operator to conclude that the lowest speed has been selected.

Figure 4:
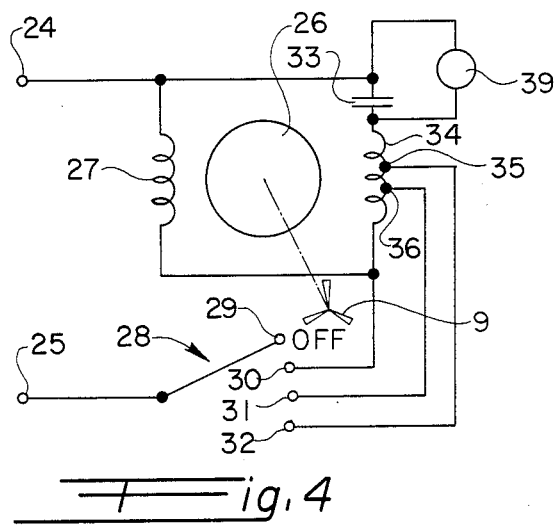
FIG. 4 is a simplified schematic diagram of a variant of the ceiling fan illustrated in FIG. 3.

As illustrated in FIG. 4, a variant of the second exemplary embodiment includes diagrammatically shown fan blades 9. Alternating current (a.c.) power is supplied via a pair of input terminals 24, 25 to the split-phase induction motor which includes a rotor 26, the rotor being mechanically coupled or connected to the fan blades 9. The induction motor includes a main stator winding 27 and an auxiliary stator winding 34 which also functions as a starting winding, the auxiliary stator winding being connected in series with a conventional phase shifting capacitor 33, this series connected circuit being connected in parallel with the main stator winding 27.

One terminal of the capacitor 33 and one terminal of the main stator winding 27 are conductively connected to the a.c. input terminal 24. The other ends of the stator windings 27 and 34 are coupled to the second terminal 25 from the a.c. source, via a single pole, four-position switch 28. In its OFF position, the single pole of the switch 28 is positioned on an open or rest terminal 29 and no current is supplied to either of the main stator winding 27 and the auxiliary stator winding 34.

In its first ON position, the single pole of the switch 28 contacts a terminal 30, placing full a.c. voltage across the main stator winding 27 and across the series connection of the auxiliary stator winding 34 and the phase shifting capacitor 33. A lamp 39 is connected in parallel to the capacitor 33. In this position, maximum speed is called for and the full magnitude of a.c. voltage appears across the main stator winding 27. The lamp 39 receives a proportion of the full a.c. voltage, a given magnitude of current flows through the lamp and it glows with a given perceptable intensity. This allows an operator to know immediately that the selected speed is the maximum, even before the fan gets up to the selected speed. In its second ON position, the single pole of the switch 28 contacts a terminal 31, which is conductively coupled to a tap 36 on the auxiliary stator winding 34. In this case less than full a.c. voltage appears across the main stator winding 27, some of it appearing across the lower portion of the auxiliary stator winding 34. Less than full a.c. voltage appears across the capacitor 33 and the lamp 39, current of less than maximum magnitude flows through the lamp 39 and it glows with a predetermined perceptable intensity, making it easy for the operator to conclude from merely observing the light intensity (brightness) of the lamp that the fan is being operated at its second speed, even before this actual speed is achieved. In the third ON position of the switch 28, the single pole thereof contacts a terminal 32, thereby placing the terminal 25 in series with a second tap 35 on the auxiliary stator winding 35. The a.c. motor is thus called to operate at its lowest speed, still less than full a.c. voltage is applied across the main stator winding 27 and across the series connected capacitor 33 and the auxiliary stator winding 34. As a result, the lamp 39 glows with third perceptable intensity different from the above-mentioned given and predetermined intensities, allowing the operator to conclude that the lowest speed has been selected.

Figure 5:
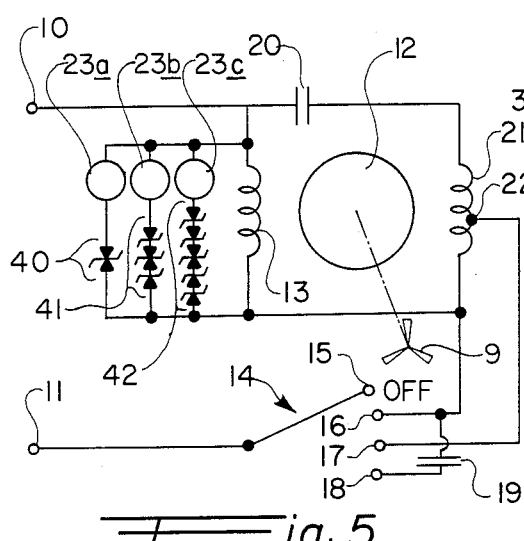
FIG. 5 is a simplified schematic diagram of an exemplary third embodiment of a ceiling fan constructed in accordance with the present invention, plural lamps being provided as selected speed indicating devices.

As illustrated in FIG. 5, the third exemplary embodiment includes diagrammatically shown fan blades 9. Alternating current (a.c.) power is supplied via a pair of terminals 10, 11 to the split-phase induction motor which includes a rotor 12, the rotor being mechanically coupled or connected to the fan blades 9. The induction motor includes a main stator winding 13 and an auxiliary stator winding 21 which also functions as a starting winding, the auxiliary stator winding being connected in series with a conventional phase shifting capacitor 20, these series connected components being connected in parallel with the main stator winding 13.

One terminal of the capacitor 20 and one terminal of the main stator winding 13 are conductively connected to the a.c. input terminal 10. The other ends of the stator windings 13 and 21 are coupled to the second terminal 11 from the a.c. source, via a single pole, four-position switch 14. In its OFF position, the single pole of the switch 14 is positioned on an open or rest terminal 15, and no current is supplied to either of the main stator winding 13 and the auxiliary stator winding 21.

In its first ON position, the single pole of the switch 14 contacts a terminal 16, placing full a.c. voltage across the main stator winding 13 and across the series connection of the auxiliary stator winding 21 and the phase shifting capacitor 20. In this position, maximum speed is called for and the full magnitude of a.c. voltage appears across the main stator winding 13, which has a plurality of indicating lamps 23a–23c conductively connected in parallel therewith, via respective pluralities of back-to-back connected Zener diodes 40–42. The lamps 23a–23c receive full a.c. voltage, a high magnitude of current flows through the Zener diodes 40–42 and all lamps glow. This allows an operator to know immediately that the selected speed is the maximum (all lamps ON), even before the fan gets up to the selected speed. In its second ON position, the single pole of the switch 14 contacts the terminal 17, which is conductively coupled to a tap 22 on the auxiliary stator winding 21. In this case less than full a.c. voltage appears across the main stator winding 13, some of it appearing across the lower portion of the auxiliary stator winding 21. Thus, less than full a.c. voltage appears across the respective series connection of the lamp 23a and Zener diodes 40, the lamp 23b and the Zener diodes 41 and the lamp 23c and the Zener diodes 42, the voltage is insufficient to effect breakdown of the diodes 42 and no current flows through the lamp 23c. The voltage magnitude is, however, sufficient to effect breakdown of the Zener diodes 40 and 41 which allows the two lamps 23a and 23b to glow, making it easy for the operator to conclude from merely observing the glowing of the lamps 23a and 23b that the fan is being operated at its second speed, even before this actual set second speed is achieved. In the third ON position of the switch 14, the single pole thereof contacts the terminal 18, thereby placing a voltage-dropping capacitor 19 in series with both the main stator winding 13 and the auxiliary stator winding 21. The a.c. motor is thus called to operate at its lowest speed, still even less than full a.c. voltage is applied across the main stator winding 13. As a result, only the lamp 23a glows, the voltage magnitude being sufficient to break down the Zener diodes 40, but insufficient to breakdown the Zener diodes 41 and the Zener diodes 42, allowing the operator to conclude from observing that only the one lamp 23a glows, that the lowest speed has been selected even in advance of the fan achieving the set speed.

Figure 6:
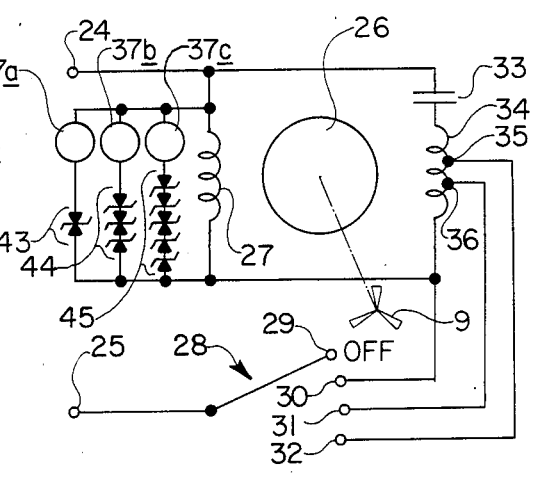
FIG. 6 is a simplified schematic diagram of a variant of the ceiling fan illustrated in FIG. 5.

As illustrated in FIG. 6, a variant of the third exemplary embodiment includes diagrammatically shown fan blades 9. Alternating current (a.c.) power is supplied via a pair of terminals 24, 25 to the split-phase induction motor which includes a rotor 26, the rotor being mechanically coupled or connected to the fan blades 9. The induction motor includes a main stator winding 27 and an auxiliary stator winding 34 which also functions as a starting winding, the auxiliary stator winding being connected in series with a conventional phase shifting capacitor 33, this series connected branch being in parallel with the main stator winding 27.

One terminal of the capacitor 33 and one terminal of the main stator winding 27 are conductively connected to the a.c. input terminal 24. The other ends of the main stator windings 27 and the auxiliary stator winding 34 are coupled to the second terminal 25 from the a.c. source, via a single pole, four-position switch 28. In its OFF position, the single pole of the switch is positioned on a rest or open terminal 29 and no current is supplied to either of the stator windings 27 and 34.

In its first ON position, the single pole of the switch 28 contacts a terminal 30, placing full a.c. voltage across the main stator winding 27 and across the series connection of the auxiliary stator winding 34 and the phase shifting capacitor 33. In this position, maximum speed is called for and the full magnitude of a.c. voltage appears across the main stator winding 27, which has respective indicating lamps 37a–37c conductively connected in parallel therewith, via respective pluralities of back-to-back connected Zener diodes 43–45. Full magnitude voltage appears across the respective series connected lamp 37a and Zener diodes 43, the series connected lamp 37b and Zener diodes 44, and the series connected lamp 37c and the diodes 45. The magnitude of the voltage is sufficient to break down all of the Zener diodes 43–45 and all of the lamps 37a–37c have current flowing therein and, consequently, glow. This allows an operator, by observing that all three lamp 37a–37c glow, to know immediately that the selected speed is the maximum speed, even before the fan gets up to the selected speed. In its second ON position, the single pole of the switch 28 contacts a terminal 31, which is conductively coupled to a first tap 36 on the lower part of the auxiliary stator winding 34. In this case less than full a.c. voltage appears across the main stator winding 27, some of it appearing across the lower portion of the auxiliary stator winding 34. Thus, less than full a.c. voltage appears across the series connected lamp 37a and the Zener diodes 43, the lamp 37b and the Zener diodes 44, and the lamp 37c and the Zener diodes 45. The magnitude of the voltage is not sufficient to break down the diodes 45 and, consequently, the lamp 37c does not glow. The magnitude is still sufficient to break down the Zener diodes 43 and 44 causing the lamps 37a and 37b to be on, making it easy for the operator to conclude from merely observing the fact that only the lamps 37a and 37b are on that the fan is being operated at its second speed, even before this actual speed is achieved. In the third ON position of the switch 28, the single pole thereof contacts the terminal 32, thereby placing the terminal 25 of the a.c. source in series with both the main stator winding 27 and the auxiliary stator winding 34, via a second tap 35 on the auxiliary stator winding. The a.c. motor is thus called to operate at its lowest speed, still less than full a.c. voltage is applied across the main stator winding 27. As a result, only the lamp 37a glows because the magnitude of the voltage is such that only the Zener diodes 43 break down. The magnitude of the voltage across the main stator winding 27, in this case, is insufficient to break down the Zener diodes 45 and 44; thus, the lamps 37b and 37c are not energized. Only the lamp 37a glows, allowing the operator to conclude that the lowest speed has been selected, even before the motor obtains that speed.

Figure 7:
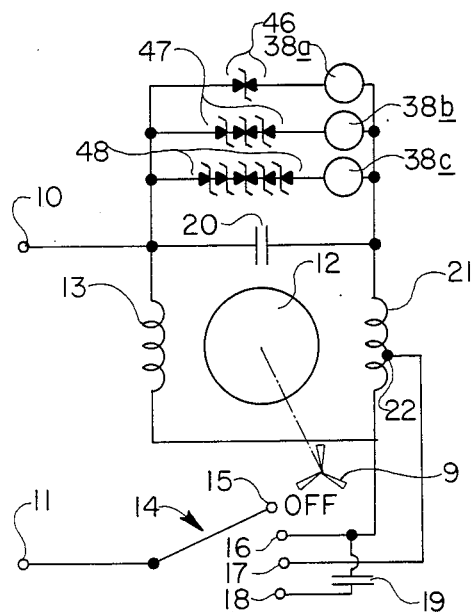
FIG. 7 is a simplified schematic diagram of an exemplary fourth embodiment of a ceiling fan constructed in accordance with the present invention, plural lamps being shown as selected speed indicating devices.

As illustrated in FIG. 7, the fourth exemplary embodiment includes diagrammatically shown fan blades 9. Alternating current (a.c.) power is supplied via a pair of terminals 10, 11 to the split-phase induction motor which includes a rotor 12, the rotor being mechanically coupled or connected to the fan blades 9. The induction motor includes a main stator winding 13 and an auxiliary stator winding 21 which also functions as a starting winding, the auxiliary stator winding being connected in series with a conventional phase shifting capacitor 20 in parallel with the main stator winding 13.

One terminal of the capacitor 20 and one terminal of the main stator winding 13 are conductively connected to the a.c. input terminal 10. The other ends of the stator windings 13 and 21 are coupled to the second terminal 11 from the a.c. source, via a single pole, four-position switch 14. In its OFF position, the single pole of the switch is positioned on a rest or open terminal 15 and no current is supplied to either of the stator windings 13 and 21.

In its first ON position, the single pole of the switch 14 contacts terminal 16, placing full a.c. voltage across the main stator winding 13 and across the series connection of the auxiliary stator winding 21 and the phase shifting capacitor 20. In this position, maximum speed is called for and the full magnitude of a.c. voltage appears across the main stator winding 13.

In its second ON position, the single pole of the switch 14 contacts the terminal 17, which is conductively coupled to a tap 22 on the auxiliary stator winding 21. In this case less than full a.c. voltage appears across the main stator winding 13, some of it appearing across the lower portion of the auxiliary stator winding 21. The fan is thus called upon to operate at its second speed. In the third ON position of the switch 14, the single pole thereof contacts the terminal 18, thereby placing a capacitor 19 in series with both the main stator winding 13 and the series connection of the auxiliary stator winding 21 and the phase-shifting capacitor 20. The a.c. motor is thus called to operate at its lowest speed, still less than full a.c. voltage being applied across the main stator winding 13.

It is to be appreciated that respectively three different magnitudes of a.c. voltages appear across the capacitor 20, depending on the position of the switch 14. In one case, all of the three lamps 38a–38b glow, the magnitude of the voltage being sufficient to break down all of the Zener diodes 46–48. In the second case, the voltage magnitude is not sufficient to break down the Zener diodes 48 and no current flows in the lamp 38c. The Zener diodes 46 and 47 do break down, however, and the lamps 38a and 38b glow. Finally, in the third case, the magnitude of the voltage across the capacitor 20 is not sufficient to break down the Zener diodes 47 and 48, but is sufficient to break down the Zener diodes 46. Thus, an operator can, by observing if one, two or three of the lamps 38a–38c glow, which speed of the three possible speeds has been selected even before the fan achieves the set speed.

Figure 8:
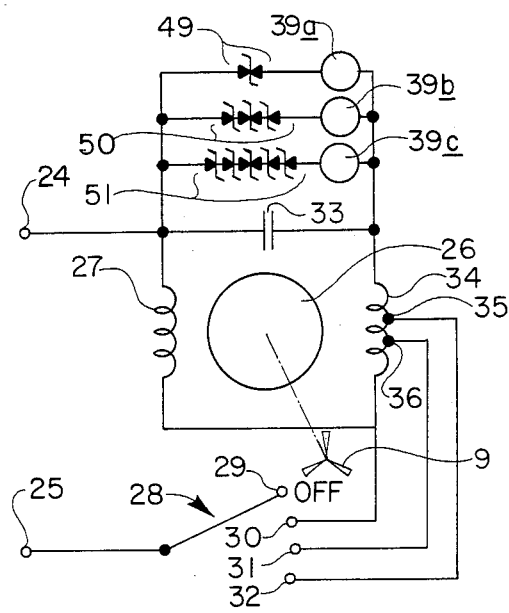
FIG. 8 is a simplified schematic diagram of a variant of the ceiling fan illustrated in FIG. 7.

As illustrated in FIG. 8, a variant of the fourth exemplary embodiment includes diagrammatically shown fan blades 9. Alternating current (a.c.) power is supplied via a pair of terminals 24, 25 to the split-phase induction motor which includes a rotor 26, the rotor being mechanically coupled or connected to the fan blades 9. The induction motor includes a main stator winding 27 and an auxiliary stator winding 34 which also functions as a starting winding, the auxiliary stator winding being connected in series with a conventional phase shifting capacitor 33, the series connected capacitor 33 and the auxiliary stator winding 34 being in parallel with the main stator winding 27.

One terminal of the capacitor 33 and one terminal of the main stator winding 27 are conductively connected to the a.c. input terminal 24. The other ends of the main stator windings 27 and the auxiliary stator winding 34 are coupled to the second terminal 25 of the a.c. source, via a single pole, four-position switch 28. In its OFF position, the single pole of the switch is positioned on a rest terminal 15 and no current is supplied to either of the stator windings 13 and 21.

In its first ON position, the single pole of the switch 28 contacts a terminal 30, placing full a.c. voltage across the main stator winding 27 and across the series connection of the auxiliary stator winding 34 and the phase shifting capacitor 33. In this position, maximum speed is called for and the full magnitude of a.c. voltage appears across the main stator winding 27. In its second ON position, the single pole of the switch 28 contacts a terminal 31, which is conductively coupled to a first tap 36 on the lower portion of auxiliary stator winding 34. In this case less than full a.c. voltage appears across the main stator winding 27, some of it appearing across the lower portion of the auxiliary stator winding 34. In the third ON position of the switch 28, the single pole thereof contacts a terminal 32, thereby placing the terminal 25 in series with a second tap 35 on the auxiliary stator winding 34.

It is to be appreciated that respectively three different magnitudes of a.c. voltages appear across the capacitor 33, depending on the position of the switch 28. In one case, all of three lamps 39a–39b glow, the magnitude of the voltage being sufficient to break down all of the Zener diodes 49–51. In the second case, the voltage magnitude is not sufficient to break down the Zener diodes 51 and no current flows in the lamp 39c. The Zener diodes 50 and 49 do break down, however, and the lamps 39a and 39b glow. Finally, in the third case, the magnitude of the voltage across the capacitor 33 is not sufficient to break down the Zener diodes 50 and 51, but is sufficient to break down the Zener diodes 49. Thus, an operator can, by observing if one, two or three of the lamps 39a–39c glow, which speed has been selected, even before the fan reaches its set speed.

Figure 9:
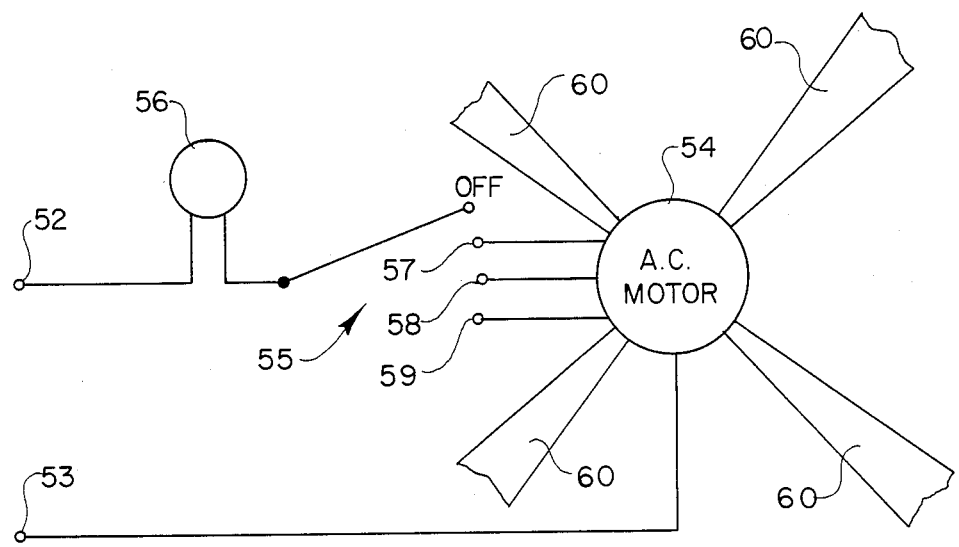
FIG. 9 is a simplified schematic diagram of an exemplary fifth embodiment of a ceiling fan constructed in accordance with the present invention, a single lamp in series with the a.c. current supply being provided as the selected speed indicating device.

The fifth embodiment of the present invention of a ceiling fan as illustrated in FIG. 9, includes an a.c. induction motor 54 which rotates a plurality of fan blades 60 at one or another of three possible speeds. The motor 54 is supplied with a.c. power from a pair of input terminals 52 and 53 via a single-pole, multiple position switch 55. The single pole of the switch 55 is connected to the one a.c. input terminal 52 via a lamp 56. The internal circuit of the a.c. motor 54 is conventional, three respective different speeds being provided depending on which of three ON terminals 57–59 of the switch 55 is connected, as a result of selection by an operator, to the single pole of the switch 55. The greater the speed of the motor, the greater the magnitude of current which flows through the lamp 56. As a result, the lamp 56 glows brightest at full speed, moderately at medium speed, and relatively less than moderately at low speed. Thus, an operator by observing the brightness of the glowing lamp 56, can conclude which of the three operating speeds has been selected, even before the fan blades 60 reach the set speed.

Figure 10A:
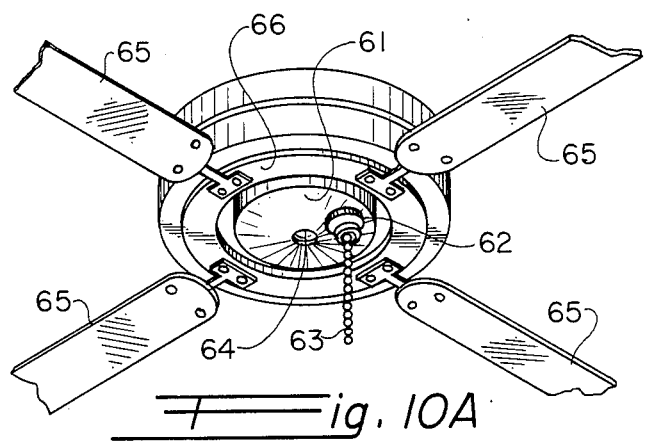
FIG. 10A is a simplified pictorial illustration of a ceiling fan into which any of the circuits illustrated in FIGS. 1-4 and 9 can be incorporated, the single lamp being visible.

As illustrated pictorially in FIG. 10A, the ceiling fan of any one of FIGS. 1–4 and 9 may include a switch housing 61 within which the multiposition, speed-selecting switch (14 FIGS. 1, 3; 28, FIGS. 2, 4; 56, FIG. 9) is positioned. The housing 61 may be mounted on the stator of the a.c. motor. The switch includes an exterior portion 62 which extends through an aperture in the housing 61, a conventional actuator, illustrated as a pull chain 63, being provided. In accordance with a preferred feature of the present invention the single lamp (23, FIG. 1; 37, FIG. 2; 38, FIG. 3; 39, FIG. 4; 56, FIG. 9) is positioned behind a central aperture 64 in the housing 61 so that the intensity of the light produced by the lamp, indicating selected fan speed, can be readily discerned by an operator. A plurality of fan blades 65, which correspond to the blades 9 shown diagrammatically in FIGS. 1–4, or blades 60 shown diagrammatically in FIG. 9, are connected to a rotor 66 of the motor so as to rotate therewith.

Figure 10B:
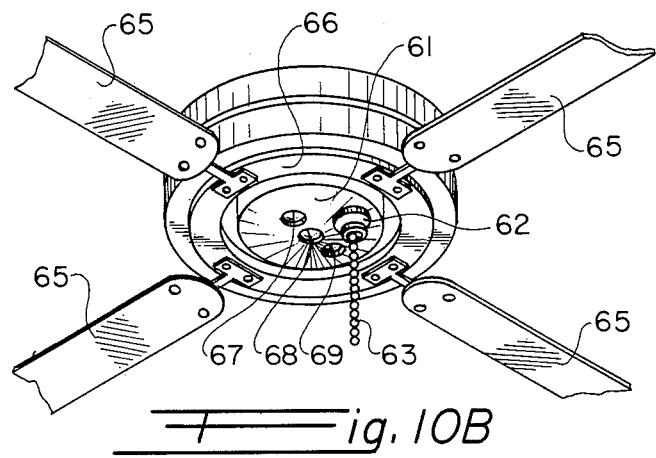
FIG. 10B is a simplified pictorial illustration of a ceiling fan into which any of the circuits of FIGS. 5-8 can be incorporated, plural lamp being visible.

As shown in FIG. 10B, wherein like numerals designate like parts to those of FIG. 10A, the aperture 64 (FIG. 10A) is replaced by three apertures 67, 68 and 69 behind which the plurality of lamps (23a–23c, FIG. 5; 37a–37c, FIG. 6; 38a–38c, FIG. 7; 39a–39c, FIG. 8) are respectively positioned so that an operator can readily observe the number of lamps which are producing light and thus objectively conclude at which of the three possible speeds the fan is set to run.

It is to be understood that the foregoing description of the preferred embodiments and variants have been set out by way of example, not by way of limitation. It is to be appreciated that many other embodiments and variants are possible without departing from the spirit and scope of the invention, its scope being defined by the appended claims.

What is claimed is:

1. In a ceiling fan having a plurality of blades, speed-selecting switch means, a rotor and at least one stator winding, said speed-selecting switch means being operatively arranged to apply respectively different magnitudes of voltage across the at least one stator winding for each respective speed, an improvement comprising at least one lamp fixedly and conductively connected in parallel to at least a portion of said at least one stator winding, whereby the intensity of light from the at least one lamp is indicative of the selected speed as set by the speed-selecting switch means.

2. The ceiling fan according to claim 1, wherein said at least one lamp is a single lamp.

3. The ceiling fan according to claim 1, wherein said at least one lap is a single lamp connected in parallel to the at least one stator winding.

4. The ceiling fan according to claim 1, including nonrotating mounting means for supporting said at least one lamp so it is viewable from beneath the fan.

5. In a ceiling fan having a plurality of blades; speed-selecting switch means; a rotor; a main stator winding; an auxiliary stator winding; and a phase-shifting capacitor connected in series with the auxiliary stator winding, said phase-shifting capacitor and said auxiliary winding being connected in series across said main stator winding, and said speed-selecting switch means being operatively arranged to place respectively different magnitudes of voltage across the phase-shifting capacitor for each respective speed, an improvement comprising at least one lamp fixedly and conductively connected in parallel to said phase-shifting capacitor, whereby the intensity of light from the at least one lamp is indicative of the selected speed as set by the speed-selecting switch means.

6. The ceiling fan according to claim 5, wherein said at least one lamp is a single lamp.

7. The ceiling fan according to claim 5, including nonrotating mounting means for supporting said at least one lamp so it is viewable from beneath the fan.

8. In a ceiling fan having a plurality of blades, speed-selecting switch means, a rotor and at least one stator winding, said speed-selecting switch means being operatively arranged to apply respectively different magnitudes of voltage across the at least one stator winding for each respective speed, an improvement comprising respective pluralities of Zener diodes, a plurality of lamps individual ones of which are fixedly respectively connected in parallel to at least a portion of said at least one stator winding via respective ones of said pluralities of Zener diodes, whereby the individual ones of the lamps become energized as the voltage across the at least one stator winding increases, the number of lamps energized at any given time being indicative of the selected speed.

9. The ceiling fan according to claim 8, wherein respective ones of said lamps and the respective pluralities of Zener diodes are fixedly connected in parallel to the stator winding.

10. The ceiling fan according to claim 8, including nonrotating mounting means for supporting said plurality of lamps so the lamps are viewable from beneath the fan.

11. In a ceiling fan having a plurality of blades; speed-selecting switch means; a rotor; a main stator winding; an auxiliary stator winding; and a phase-shifting capacitor connected in series with the auxiliary stator winding, said phase-shifting capacitor and said auxiliary winding being connected in series across said main stator winding, and said speed-selecting switch means being operatively arranged to place respectively different magnitudes of voltage across the phase-shifting capacitor for each respective speed, an improvement comprising respective pluralities of Zener diodes, a plurality of lamps individual one of which are fixedly respectively connected in parallel to the phase-shifting capacitor via respective ones of said pluralities of Zener diodes, whereby the individual ones of the lamps become energized as the voltage across the phase-shifting capacitor increases, the number of lamps energized at any given time being indicative of selected speed.

12. The ceiling fan according to claim 11, wherein respective ones of said lamps and the respective ones of the pluralities of Zener diodes are fixedly connected in parallel to the phase-shifting capacitor.

13. The ceiling fan according to claim 11, including nonrotating mounting means for supporting said plurality of lamps so the lamps are viewable from beneath the fan.

14. In a ceiling fan having a plurality of blades, speed-selecting switch means, a rotor and at least one stator winding, said speed-selecting switch means being operatively arranged to apply respectively different magnitudes of voltage across the at least one stator winding for each respective speed, an improvement comprising respective pluralities of back-to-back connected diodes, a plurality of lamps individual ones of which are fixedly respectively connected in parallel to at least a portion of said at least one stator winding via respective ones of said pluralities of back-to-back connected diodes, whereby the individual ones of the lamps become energized as the voltage across the at least one stator winding increases, the number of lamps energized at any given time being indicative of the selected speed.

15. The ceiling fan according to claim 14, wherein respective ones of said lamps and the respective pluralities of back-to-back connected diodes are connected in parallel to the stator winding.

16. The ceiling fan according to claim 14, including nonrotating mounting means for supporting said plurality of lamps so that lamps are viewable from beneath the fan.

17. In a ceiling fan having a plurality of blades; speed-selecting switch means; a rotor; a main stator winding; an auxiliary stator winding; and a phase-shifting capacitor connected in series with the auxiliary stator winding, said phase-shifting capacitor and said auxiliary winding being connected in series across said main stator winding, and said speed-selecting switch means being operatively arranged to place respectively different magnitudes of voltage across the phase-shifting capacitor for each respective speed, an improvement comprising respective pluralities of back-to-back connected diodes, a plurality of lamps individual ones of which are fixedly respectively connected in parallel to the phase-shifting capacitor via respective ones of said pluralities of back-to-back connected diodes, whereby the individual ones of the lamps become energized as the voltage across the phase-shifting capacitor increases, the number of lamps energized at any given time being indicative of selected speed.

18. The ceiling fan according to claim 17, wherein respective ones of said lamps and the respective ones of the pluralities of back-to-back connected diodes are fixedly connected in parallel to the phase-shifting capacitor.

19. The ceiling fan according to claim 17, including nonrotating mounting means for supporting said pluralities of lamps so that the lamps are viewable from beneath the fan.

* * * * *